United States Patent [19]
Ackerman et al.

[11] Patent Number: 6,028,881
[45] Date of Patent: Feb. 22, 2000

[54] WAVELENGTH SELECTABLE LASER SOURCE

[75] Inventors: David Alan Ackerman, Hopewell; John Evan Johnson, New Providence, both of N.J.

[73] Assignee: Lucent Technologies Inc., Murray Hill, N.J.

[21] Appl. No.: 08/966,828

[22] Filed: Nov. 10, 1997

[51] Int. Cl.[7] .................................................. H01S 3/0941
[52] U.S. Cl. .................................. 372/75; 372/6; 372/70
[58] Field of Search .............................. 372/75, 20, 70, 372/69, 6

[56] References Cited

U.S. PATENT DOCUMENTS 5,675,592  10/1997  Dragone et al. ........................ 372/20
5,881,079   3/1999  Doerr ...................................... 372/20

Primary Examiner—James W. Davie

[57] ABSTRACT

In accordance with the present invention, a wavelength selectable laser source comprises a tunable pump source, an array of waveguide lasers for emitting light at respectively different wavelengths and a router for directing light from the pump source to an appropriate waveguide laser. A second router can be used to direct all laser outputs to a common output waveguide. The result is a wavelength selectable, stable signal source. In preferred embodiments the routers are dense wavelength-division multiplexers (DWDMs) and the waveguide lasers are rare-earth doped fiber lasers. Alternative embodiments provide a variety of ways of routing the pumping source.

9 Claims, 3 Drawing Sheets

WAVELENGTH SELECTABLE LASER SOURCE

FIELD OF THE INVENTION

This invention relates to multiple wavelength laser sources and, in particular, to multiple wavelength laser sources wherein the wavelength of the laser output can be selected by controlling the wavelength of the pumping source.

BACKGROUND OF THE INVENTION

Laser sources capable of emitting light at a selectable wavelength are useful in a wide variety of applications including telecommunications, optical recording and playback, and optical memory applications. Tunable semiconductor lasers are compact, inexpensive, and electrically tunable over a wide range, but they tend to have poor long-term frequency and output power stability. Solid state waveguide lasers have good frequency stability, but are difficult to tune. Accordingly, there is a need for a new wavelength selectable laser source combining the convenient wide-range electrical tunability of semiconductor lasers and the enhanced frequency stability of solid-state waveguide lasers.

SUMMARY OF THE INVENTION

In accordance with the present invention, a wavelength selectable laser source comprises a tunable pump source, an array of waveguide lasers for emitting light at respectively different wavelengths and a router for directing light from the pump source to an appropriate waveguide laser. A second router can be used to direct all laser outputs to a common output waveguide. The result is a wavelength selectable, stable signal source. In preferred embodiments the routers are dense wavelength-division multiplexers (DWDMs) and the waveguide lasers are rare-earth doped fiber lasers. Alternative embodiments provide a variety of ways of routing the pumping source.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are to illustrate the concepts of the invention and are not to scale.

DETAILED DESCRIPTION

Figure 1:
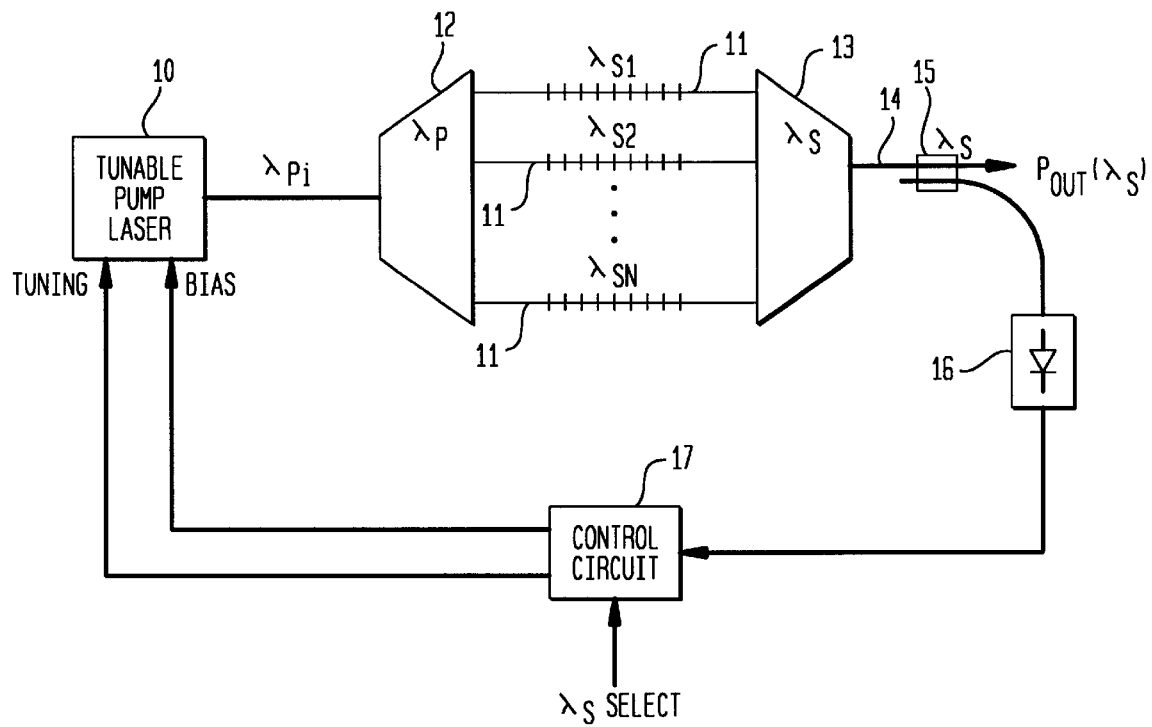
FIG. 1 is a schematic diagram of a wavelength selectable laser source.

Referring to the drawings, FIG. 1 is a schematic diagram of a first embodiment of a wavelength selectable laser source comprising a pump source 10 tunable among a plurality of pump wavelengths $\lambda_{p1}, \lambda_{p2}, \ldots \lambda_{pn}$, an array of n waveguide lasers 11, each capable of emission at a different wavelength $\lambda_{s1}, \lambda_{s2}, \ldots, \lambda_{sn}$ and a pair of wavelength routers 12, 13. Router 12 directs light from pumping source 10 in accordance with its wavelength into the appropriate waveguide laser 11, and router 13 directs light from each of the lasers 11 into a common output waveguide 14. For convenience, it is assumed that pump wavelength $\lambda_{pi}$ pumps the waveguide laser emitting at $\lambda_{si}$. Advantageously, a portion of the output signal $\lambda_s$ (about 1%) is tapped from the output waveguide 14 by tap 15, detected, by photodiode 16, and fed back to a control circuit 17. The control circuit 17, in turn, permits adjustment of the tuning and bias of pump source 10 to maintain a desired output wavelength and power. This device can be implemented using either fiber waveguides, planar waveguides or a combination thereof.

In a preferred embodiment, the pumping source is a tunable pump laser such as a tunable distributed Bragg reflector (DBR) laser constructed of semiconductor materials such as InGaAsP. The wavelength routers are dense wavelength division multiplexers (DWDMs) which can be constructed using a variety of commercial technologies including fiber Bragg gratings, thin-film interference filters, or arrayed-waveguide gratings. For telecommunications applications, the waveguide lasers are preferably Er-doped quarter-wave shifted distributed feedback (DFB) fiber grating lasers for signal output wavelengths $\lambda_s$ in the 1550 nm band (1535–1565 nm), and exemplary pump wavelengths 4 can be 532, 980 and 1480 nm.

Figure 2:
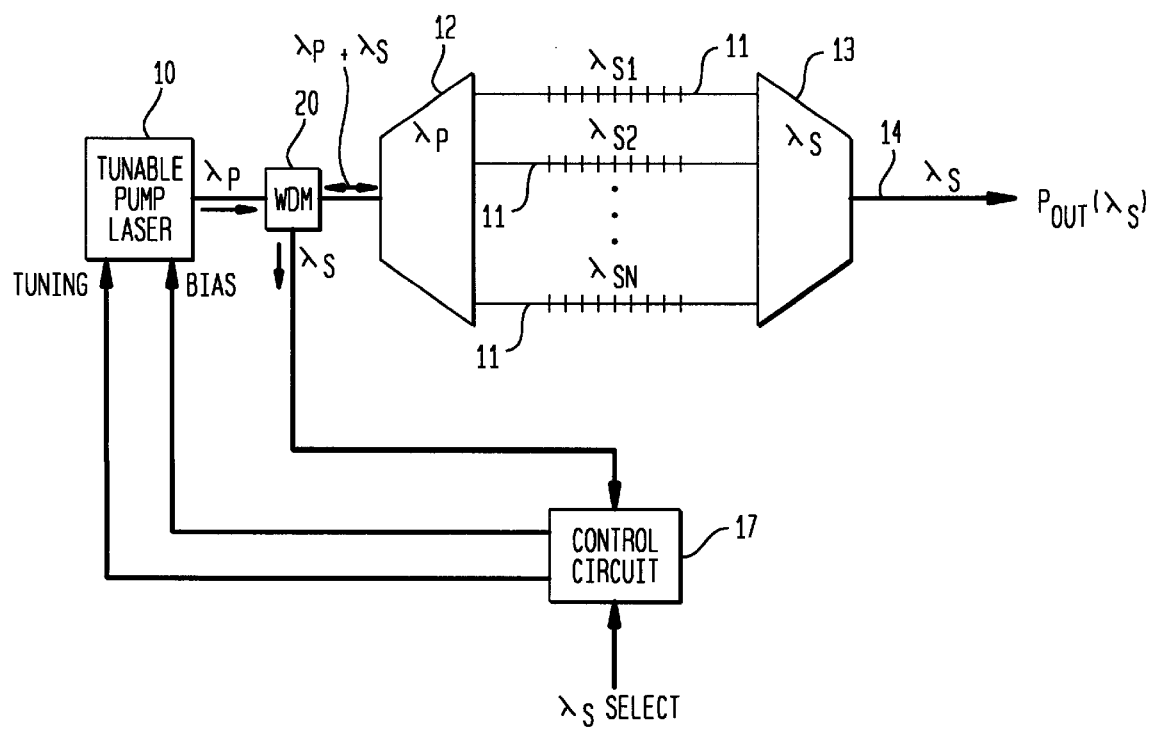
FIGS. 2–6 are schematic diagrams of alternative embodiments.

FIG. 2 illustrates an embodiment of the wavelength selectable laser source which results in a larger feedback signal to the photodiode 16 and eliminates the tap 15 and its drain on the output signal. Instead a wavelength division multiplexer (WDM) 20 for separating the pump wavelength $\lambda_p$ and the output wavelength $\lambda_s$ is disposed in the path between pump source 10 and router 12. The back-propagating $\lambda_s$ signal, which otherwise would be lost, is used as the feedback signal.

Figure 3:
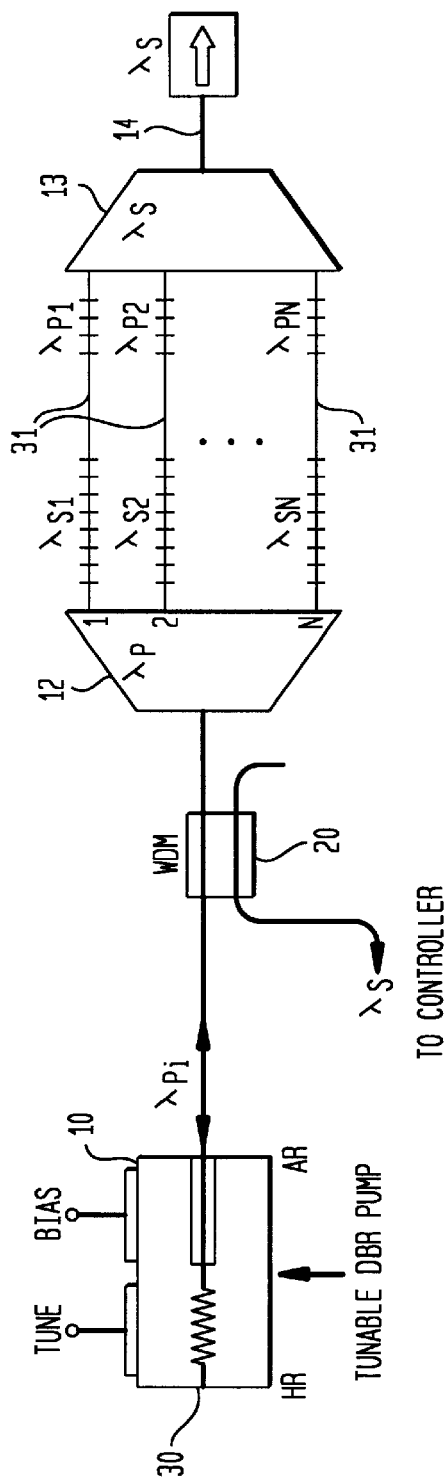

FIG. 3 illustrates an embodiment of a wavelength selectable laser source using intra-cavity pumping. This device differs from that of FIG. 1 primarily in that the pump source 10 is a tunable fiber external cavity laser provided with a pump reflector 30. Reflector 30 can be a tunable reflector with a single reflection peak such as a tunable Bragg grating. Each rare-earth fiber laser 11 is provided with a pump reflector 31 at its pumping wavelength $\lambda_{pi}$, such as a narrowband or broadband reflector, so that the pump laser cavity encompasses fiber laser 11. The laser 11 is subjected to multiple-pass, intracavity pumping for high pumping efficiency.

Figure 4:
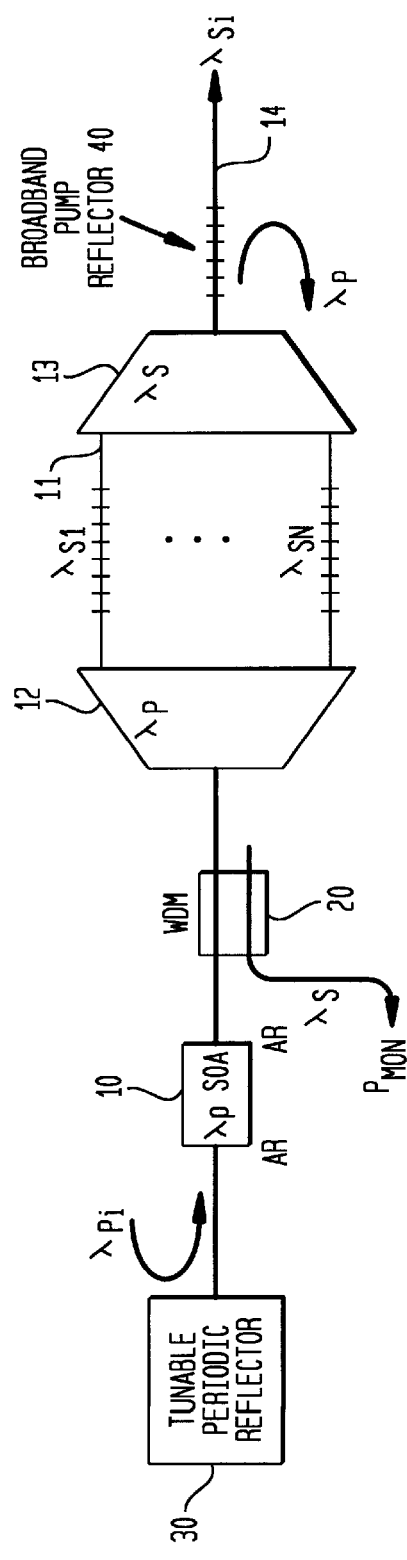

Alternatively to individual reflectors 31, a single broadband pump reflector can be placed in the output fiber 14, (see FIG. 4). In such cases, the routing DWDMs 12, 13 should be the same. The peak of pump reflector 30 is tuned to line up with one of the passbands of the DWDMs in order to select that laser.

Pump reflector 30 can also be a tunable reflector with a comb of equally spaced reflection peaks such as an interferometer, a tunable sampled grating or a tunable superstructure grating. The comb spacing is advantageously chosen by design to be slightly different than the router passband spacing so that as the comb is tuned, only one reflection peak at a time lines up with one of the passbands of the DWDM ("vernier" tuning). As previously described, the other pump reflectors for the laser cavity can be narrow or broadband reflectors placed after the fiber lasers or a broadband pump reflector disposed in the output fiber.

In yet a third alternative, pump reflector 30 can be a broadband pump reflector such as a cleaved facet and the other pump reflectors 31 can be switchable narrowband pump reflectors chosen to switch between a pumping wavelength within the passband of DWDMs 12, 13 and one without, thereby switching between an "on" state and an "off" state. Thus one or more channels can be selected by tuning one or more of reflectors 31 so that their reflection peaks line up with one or more passbands of the DWDM.

FIG. 4 shows a modification of the FIG. 3 device wherein instead of a plurality of different fixed wavelength gratings 31 in the fiber lasers, a single broadband pump reflector 40 is disposed in the output waveguide 14. This structure, like that of FIG. 3, provides intra-cavity pumping.

Rather than a single broadband pump reflector 40 in waveguide 14, one could alternatively provide in the waveguide a plurality of Bragg gratings (not shown) with respective fixed reflection wavelengths at the different pump wavelengths $\lambda_{pi}$. If desired, these gratings could be individually switchable for controllable launching of two or more wavelengths.

Figure 5:
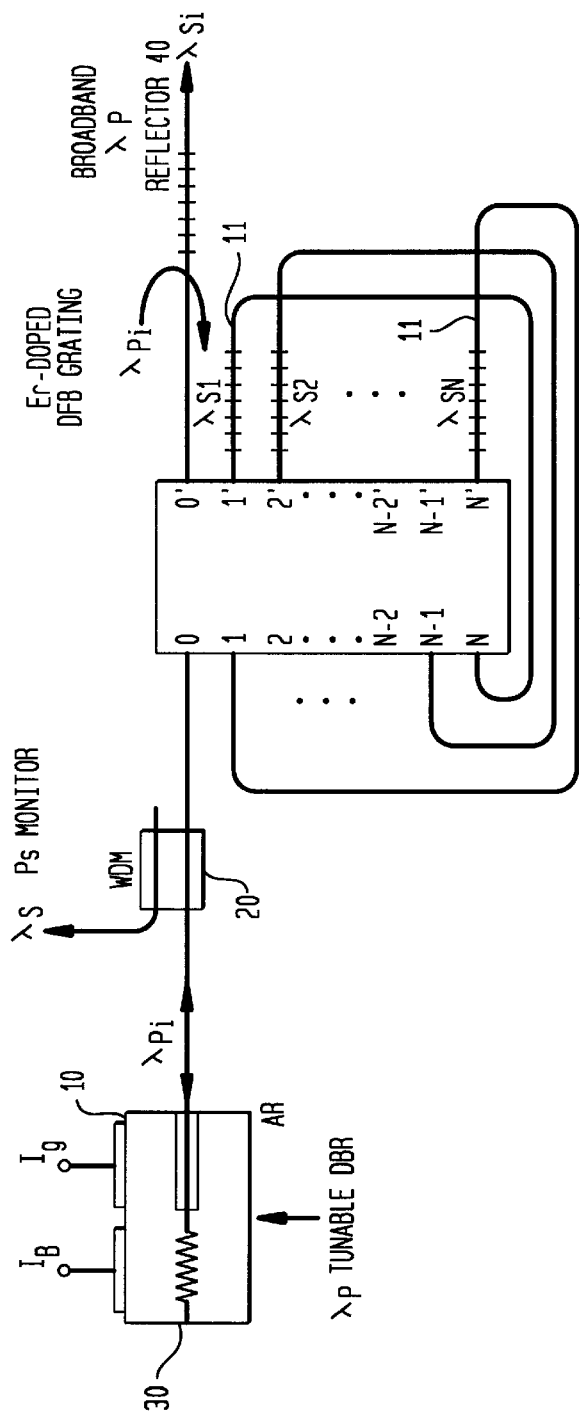

FIG. 5 illustrates a wavelength selectable laser source of economical design wherein only one waveguide grating router (WGR) 50 need be used. This design utilizes the fact that if the input port of a WGR is shifted, then the output ports shift the same number and the last port is wrapped around.

In operation, pump light at $\lambda_{pi}$ enters, the WGR 50 and is routed to output port i' where it pumps the fiber grating laser at $\lambda_{si}$. The signal and unused pump power are fed back to input port N+1−i. From input port N+1−i, both $\lambda_{pi}$ and $\lambda_{si}$ are routed to the output port 0'. The signal is coupled out, and the pump $\lambda_{pi}$ is reflected back by reflector 40 over the same path in reverse.

Figure 6:
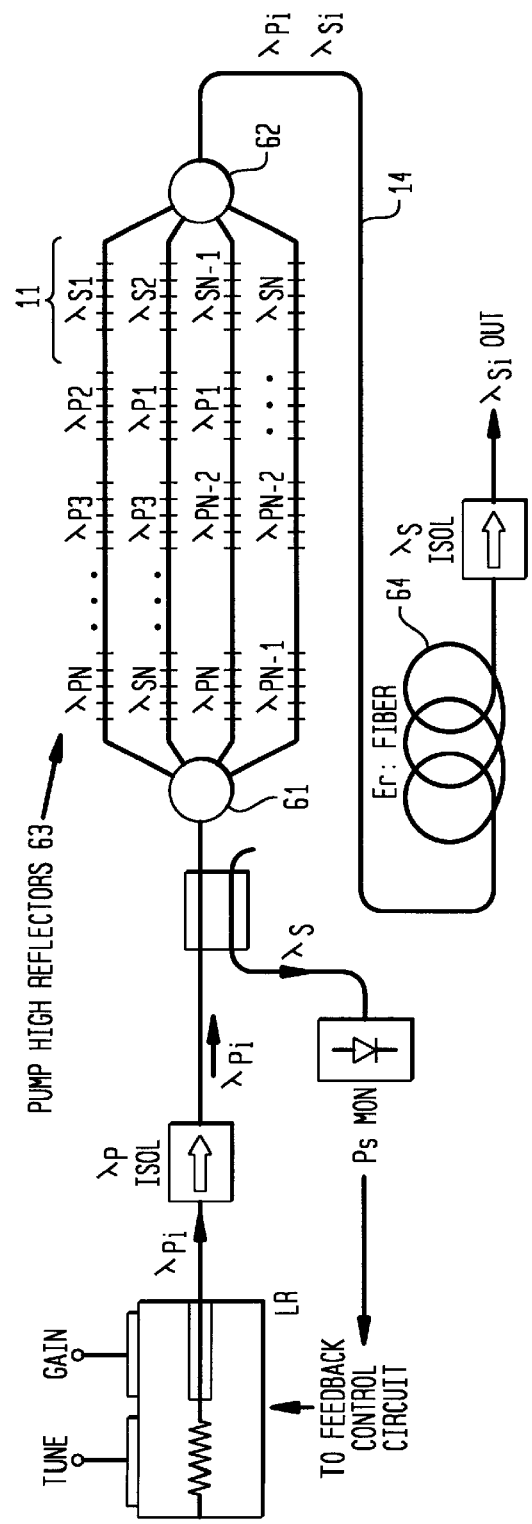

FIG. 6 illustrates a wavelength selectable laser source of economical design wherein a pair of passive star couplers 61, 62 in combination with pump wavelength gratings 63 are used as the routers. Specifically, pump wavelength gratings 63 are provided at the input of each waveguide laser 11 to reflect all pump wavelengths but one before they enter the active region of the laser. The gratings 63 permit entry of only $\lambda_{pi}$ to the waveguide laser of wavelength $\lambda_{si}$. In addition a rare-earth doped optical waveguide amplifier 64 is advantageously placed in the output waveguide, using the remaining pump light to boost the output signal. This post-amplification technique can also be used with the wavelength selectable laser sources of FIGS. 1 and 2.

In operation pumping light from pumping source 10 is split by star coupler 61 into a plurality of beams, one for each waveguide laser 11. But, depending on the pumping light wavelength, only one pumping beam in one laser 11 penetrates the gratings 63 to reach the laser active region. The pumping beams to the remaining lasers are all reflected back. Thus pump wavelength $\lambda_{pi}$ results in emission of $\lambda_{si}$.

The light emitted by the selected laser is directed by the second star coupler 62 into common output path 14 where it is advantageously amplified by Erbuim amplifier 64.

More efficient pumping can be achieved by positioning a after each laser, a highly reflective grating (not shown) for reflecting the laser pump wavelength. This positions the waveguide laser within the pump laser cavity for efficient intra-cavity pumping.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. A wavelength selectable laser source comprising:

a pump source tunable among a plurality of pumping wavelengths $\lambda_{p1}, \lambda_{p2}, \ldots \lambda_{pn}$;

a plurality of waveguide lasers responsive to respective ones of said pumping wavelengths for emitting light at respective wavelengths $\lambda_{s1}, \lambda_{p2}, \ldots \lambda_{sn}$; and an optical router interconnecting said pump source and said plurality of waveguide lasers so that each pump wavelength $\lambda_{pi}$ is directed to a respective waveguide laser responsive to said pump wavelength for emitting light at $\lambda_{si}$, whereby the wavelength of laser emission is selectable by the pumping wavelength.

2. A laser source according to claim 1 including a second optical router and a common output waveguide, said second router interconnected between said plurality of waveguide lasers and said common output waveguide for directing the outputs of said waveguide lasers to said output waveguide.

3. A laser source according to claim 2 including a feedback control unit responsive to a sample of $\lambda_s$ for tuning the wavelength $\lambda_p$ of said tunable pump source.

4. A laser source according to claim 1 wherein said plurality of waveguide lasers comprises a plurality of rare-earth doped optical fiber lasers.

5. A laser source according to claim 1 wherein said plurality of waveguide lasers comprises a plurality of quarter-wave shifted DFB fiber grating lasers.

6. A laser source according to claim 1 wherein said plurality of waveguide lasers emit at wavelengths in the range 1540 to 1560 nm.

7. A laser source according to claim 1 wherein said optical router is a waveguide grating router.

8. A laser source according to claim 1 wherein said optical router comprises a star coupler and an array of fiber grating filters.

9. A laser source according to claim 1 wherein said pumping source is a fiber external cavity laser including an optical cavity and at least one waveguide laser of said plurality is disposed in said optical cavity for intra-cavity pumping of said at least one waveguide laser.

* * * * *